Patented Aug. 16, 1927.

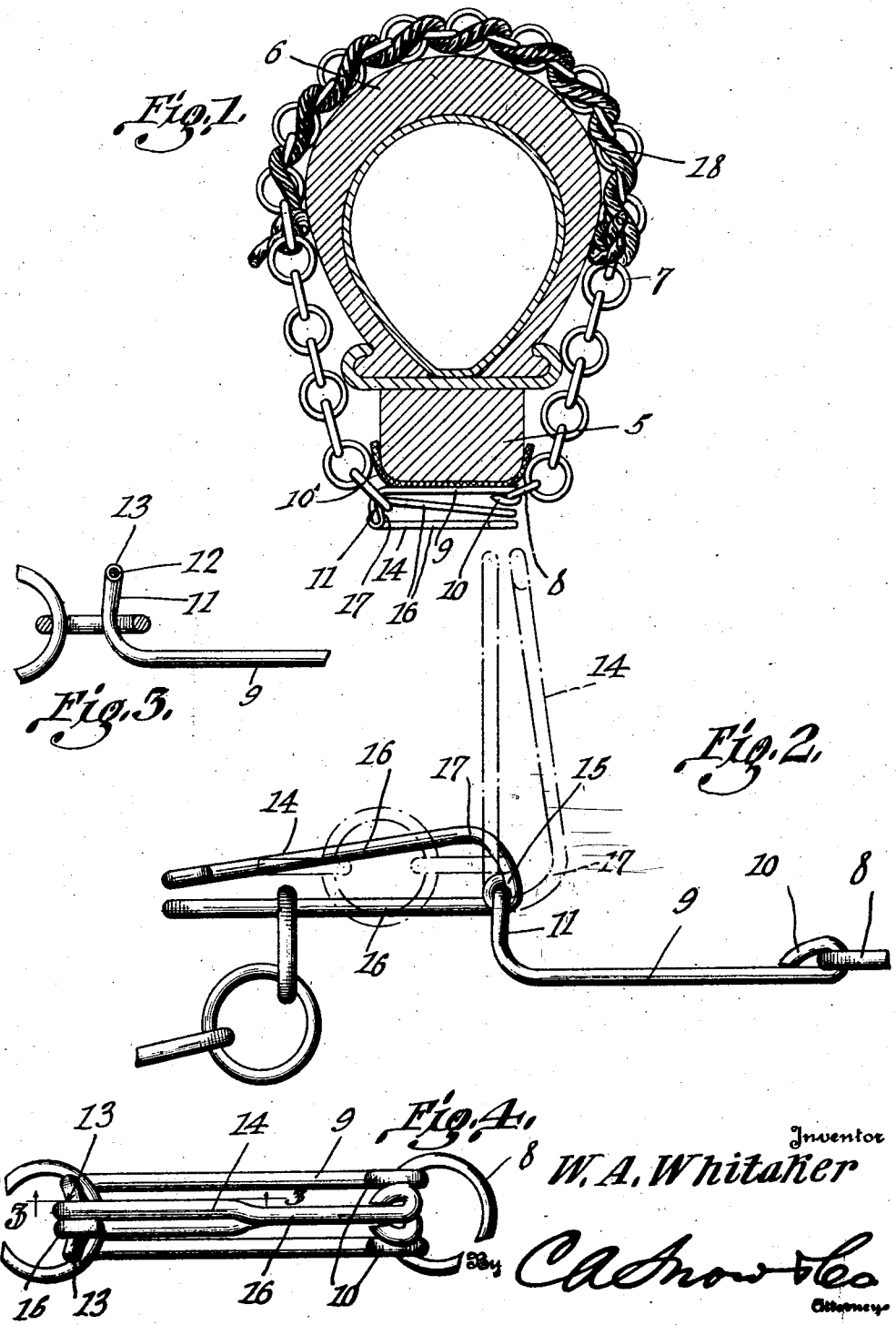

1,639,205

UNITED STATES PATENT OFFICE.

WILLIAM A. WHITAKER, OF SPRINGFIELD, MISSOURI.

SKID-CHAIN LOCK AND ROPE OR FLEXIBLE-MATERIAL MISPLACEMENT.

Application filed April 18, 1925. Serial No. 24,190.

This invention relates to anti-skid devices to be used on motor vehicle wheels to prevent skidding thereof.

The primary object of the invention is to provide an anti-skid chain, together with a novel form of fastening device designed for connecting the ends of the skid chain to insure against accidental displacement of the chains.

An important object of the invention is the provision of a fastening member which will be held in position, the construction of the fastening member being such as to be held in its locked position by the usual strain directed to the chains while in operation.

Another important object of the invention is to wrap the chain sections with rope or the like, whereby traction may be increased or diminished by changing the size of ropes used with the chains.

A still further object of the invention is to provide a device of this character which may be readily and easily positioned, eliminating the necessity of elevating the wheel to be supplied with the chain, to position it.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed, without departing from the spirit of the invention.

Referring to the drawing:

Figure 1 is a transverse sectional view through a wheel and tire supplied with an anti-skid chain constructed in accordance with the invention.

Figure 2 is an enlarged detail view illustrating the fastening member forming an important feature of the invention, the operating lever being shown in dotted lines in a half-locked position.

Figure 3 is a sectional view through one end of the fastening member, taken on the line 3—3 of Figure 4.

Figure 4 is a plan view of the fastening member in its locked position.

Referring to the drawing in detail, the reference character 5 indicates the felloe of a wheel on which the tire 6 is mounted, the tire being supplied with an anti-skid chain and fastener constructed in accordance with the invention.

The reference character 7 indicates an anti-skid chain embodying the usual connected links, the link at one end of the chain and which for the sake of illustration is indicated at 8 having connection with the body portion or main section 9 of the fastening device.

This member 9 is constructed of suitable material and may be in the form of a steel bar or length of wire material bent intermediate its ends to provide spaced leg members having their ends bent rearwardly to overlie the main portions thereof at 10, providing eyes for connecting the link 8 to the leg members. The central portion of the body 9 is bent at right angles as at 11 and is provided with a recessed portion 12 providing shoulders 13 between which the locking lever is positioned.

The reference character 10' indicates a padding member which is constructed of padding, felt, or other suitable padding material, the same being secured to the body 9 to insure against the fastening device 9 marring the finish on the felloe of the wheel on which the device is positioned.

As shown, the locking lever is indicated by the reference character 14 and includes a length of wire or steel bar bent to provide a central loop 15, and spaced arms 16, one of the arms being provided with an offset portion 17 providing a seat or keeper for the link at the opposite end of the chain, as shown by Figure 1 of the drawing, to the end that when strain is directed to the chain incident to the chain passing over the ground surface, the locking lever will be drawn towards the body portion 9 to the end that the locking lever will be locked against accidental displacement, and may only be released by swinging the locking lever to a position as shown by Figure 2 of the drawings.

In order that the traction qualities of the wheel on which the device is positioned may be increased, a flexible member such as a rope and indicated at 18 is wrapped around the links of the chain and provided with knots in its ends, which knots pass between the chain and tire to prevent the rope from becoming disconnected from the chain.

It will further be noted that due to this construction, the rope may be removed and a larger rope wrapped around the chain should it be desired to further increase the traction qualities of the wheel.

In the use of an anti-skid chain of the character described, it might be stated that a plurality of these chains may be readily and easily secured around a tire, the number of the chains relying on the condition of the road surface over which the wheels are passing.

It will be obvious that the chain may be positioned on relatively small wheels by connecting the fastening member to links that are in spaced relation with the end links of the chain.

I claim:—

A chain fastening device comprising a body portion formed of a length of wire material bent intermediate its ends to provide spaced resilient arms, said body portion having a right angled intermediate portion, a locking device formed of a length of wire material looped around the right angled portion of the body to provide a substantially straight arm and an inclined arm offset at the point of connection between the lever and body portion, one end of a chain adapted to be passed between the straight arm and inclined arm of the locking device and moved to a position within the offset portion of the lever and within the right angled portion of the body to cause the end of the chain to be secured at a point beyond the pivot point between the body portion and the locking device.

In testimony that I claim the foregoing as my own, I have hereto affixed my signature.

WILLIAM A. WHITAKER.